United States Patent [19]

Thiriet

[11] Patent Number: 5,644,638
[45] Date of Patent: Jul. 1, 1997

[54] PROCESS FOR PROTECTING COMPONENTS OF SMART OR CHIP CARDS FROM FRAUDULENT USE

[75] Inventor: Fabien P. Thiriet, Orleans, France

[73] Assignee: Solaic (société anonyme), France

[21] Appl. No.: 382,604

[22] Filed: Feb. 2, 1995

[30]     Foreign Application Priority Data

Feb. 11, 1994 [FR] France .................................. 94 01584

[51] Int. Cl.⁶ ................................ H04L 9/32; H04L 9/00
[52] U.S. Cl. .......................... 380/25; 380/4; 380/23; 380/24; 235/379; 235/380; 257/679; 257/922; 902/25; 902/26; 902/29
[58] Field of Search ........................... 380/4, 23, 24, 380/25, 30; 235/379, 380; 257/679, 922; 902/25, 26, 29

[56]            References Cited

U.S. PATENT DOCUMENTS

| 4,453,074 | 6/1984 | Weinsteiin | 235/380 |
| 4,471,216 | 9/1984 | Herve | 235/380 |
| 4,734,568 | 3/1988 | Watanabe | 235/380 X |
| 4,910,774 | 3/1990 | Barakat | 380/23 |
| 4,974,193 | 11/1990 | Beutelspacher et al. | 380/25 X |
| 5,442,704 | 8/1995 | Holtey | 380/23 |

FOREIGN PATENT DOCUMENTS

| 0216298 | 4/1987 | European Pat. Off. | G07F 7/10 |
| 2503423 | of 1981 | France | G06K 19/00 |
| 22064431 | 1/1989 | United Kingdom | G06K 19/00 |

*Primary Examiner*—Bernarr E. Gregory
*Attorney, Agent, or Firm*—Anthony J. Casella; Gerald E. Hespos

[57]            ABSTRACT

Process for protecting components of smart cards from fraudulent use, wherein the component is locked as long as an unlock order formed by a secret key has not been applied thereto, characterized in that it consists in writing in the component, at the time of its manufacture, a value and a result, the result being associated with the said value by a given algorithm and the secret key.

17 Claims, 1 Drawing Sheet

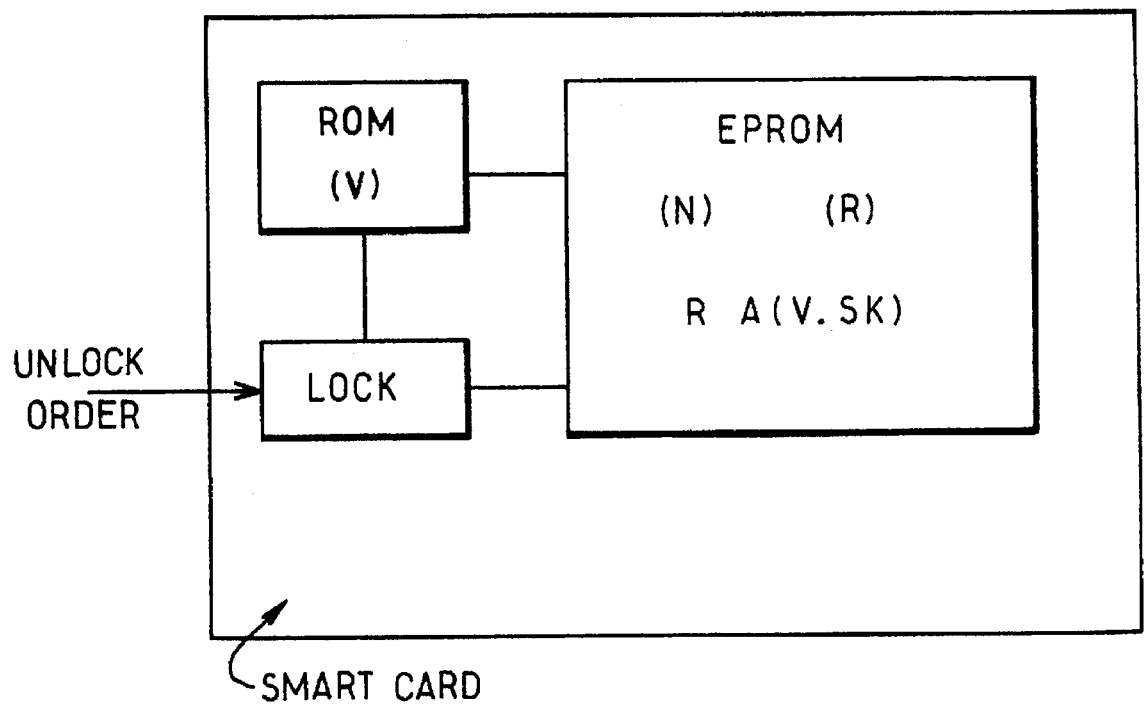

PROCESS FOR PROTECTING COMPONENTS OF SMART OR CHIP CARDS FROM FRAUDULENT USE

BACKGROUND OF THE INVENTION

The present invention relates to a process for protecting components of smart cards from fraudulent use, wherein the component is locked as long as an unlock order formed by a secret key has not been applied thereto.

At the present time, to produce a smart card according to the traditional process, one necessarily has to go through the following different stages:

I. Manufacture of the component, or "chip", at the silicon foundry.
  1. Masking of the read-only memory, or ROM, (operating system) and of the different functionalities of the component, diffusion, testing, etc.
  2. Writing of a unique number N (different for each component) and of a secret key SK in the programmable non-volatile memory of the component (EPROM, EEPROM, FLASH, etc.);
  3. Component under the control of the operating system;
  4. Delivery of the silicon wafers on which the components are produced to the smart card maker.

II. Mounting the component at the smart card maker's.
  1. Reception of the silicon wafers;
  2. Mounting in a plastic card;
  3. Unlocking the component by means of the secret key SK;
  4. Customization of the programmable non-volatile memory of the card according to the applications contemplated;
  5. Delivery of the finished product to the client.

It can be seen that, after stage I.1., the component is under the control of the operating system (ROM), which blocks any order received, as long as the unlock order formed by the secret key SK has not functioned correctly. This unlock command is only sent to the card, in fact, in stage II.3., at the smart card maker's.

However, it can also be seen that the silicon foundry writes the secret key SK in the component in stage I.2. and thus necessarily knows this key, which is generally transmitted thereto in a protected form by the smart card maker. Subsequently, dishonest foundry personnel could well unlock the component as from stage I.2., and use it for fraudulent purposes.

SUMMARY OF THE INVENTION

The main object of the present invention is thus to overcome this drawback and, for this purpose, it proposes a process for protecting the components of smart cards of the aforementioned type which is essentially characterized in that it consists in writing in the component, at the time of its manufacture, a value and a result, the result being associated with the value by a given algorithm and the secret key.

BRIEF DESCRIPTION OF THE DRAWING

The FIGURE is a block diagram illustrating a smart card in accordance with the invention.

DETAILED DESCRIPTION OF THE PREFERRED EMBODIMENT

Thanks to this arrangement, the silicon foundry no longer holds any secret and has only the value and the result written in the component, which data does not need to be kept secret. Thus, only the card manufacturer is in possession of the secret key that enables the component to be unlocked.

In one particular form of embodiment of the invention, the value is entered in the read-only memory, or ROM, of the component, whereas the result is entered in the programmable memory of the component.

It is thus possible to change the result periodically, while retaining the same value, and thus to change the secret key as well, which further reduces the risks of fraud. Indeed, to each secret key corresponds a new result, calculated by the smart card maker in accordance with the algorithm chosen.

According to another characteristic of the invention, the secret key is stored in another smart card, but in a form diversified by a number proper to the component previously entered in it.

Thus, the secret key cannot leave this card in an unencrypted form, which makes it possible to use subcontractor smart card makers without having to disclose thereto the secret key.

One form of embodiment of the invention is described hereinafter in greater detail by way of example.

The process according to the invention consists essentially in writing in the component, at the time of its manufacture and in place of the secret key SK enabling the said component to be unlocked, a value V and a result R, the result R depending both on the said value V and on the secret key SK via a given algorithm A.

Thus, to produce a smart card according to the process of the invention, one goes through the following different stages:

I. Manufacture of the component at the silicon foundry.
  1. Masking of the read-only memory, or ROM, (operating system) and of the different functionalities of the component. At this stage, a value V is also entered in the ROM.
  2. Writing of a unique number N proper to the component in question in the programmable non-volatile memory of the component, for example an EPROM. At this stage, a result R supplied by the smart card maker is also entered in the programmable EPROM.
  3. Component under the control of the operating system;
  4. Delivery of the silicon wafers to the smart card maker.

II. Mounting the component at the smart card maker's.
  1. Reception of the silicon wafers;
  2. Mounting in a plastic card;
  3. Unlocking the component by means of the secret key SK known only to the smart card maker; 4. Customization of the programmable non-volatile memory of the card. 5. Delivery of the finished product to the client.

After stage I.1., the component is under the control of the operating system of the ROM, which blocks any command received as long as the unlock order formed by the secret key SK has not functioned correctly. According to the invention, this secret key SK is associated with the value V and with the result R by an algorithm A.

The card is thus unlocked by comparing the result R written in the component with the result calculated from the value V, also written in the component, of the secret key SK, applied by the smart card maker and known only thereto, and from the algorithm A, according to the formula R=A (V.SK). If the two results are identical, the card is unlocked whereas, if the contrary applies, the card remains locked.

Of course, algorithm A will have to be designed in such a way that, if V and R are known, it is impossible to deduce therefrom the secret key SK. Indeed, the value V is in the ROM and it is not, therefore, secret, since the foundry could, in any case, know it to mask the ROM. Similarly, result R is not secret either and has to be supplied to the foundry by the smart card maker. On the other hand, the key SK is in the sole possession of the smart card maker, which is the only party authorized to unlock the card, which considerably reduces the risks of fraud.

It will further be noted that, as result R is in a rewriteable non-volatile memory, it is possible to change this result periodically without modifying the value V, and thus to change the secret key SK also, which further reduces the risks of fraud. It suffices, in fact, for the smart card maker to change the key SK to generate a new result R according to the formula R=A(V.SK).

One could also contemplate storing the secret key SK in another smart card, or so-called batch card, the key never leaving the batch card in an unencrypted form, but only diversified by the number N of the component according to the following formula: SK=A(N, SMK), wherein SMK is the secret master key stored in the batch card, and then diversified inside the batch card by means of algorithm A and of number N.

Thanks to this arrangement, it is possible to have several smart card makers without increasing the risks of fraud. Indeed, the smart card maker that has developed the operating system generates batch cards, and then sends them to the different subcontracting smart card makers without disclosing the secret key SK thereto, as the latter never leaves the batch card in an unencrypted form, but only in a diversified form.

I claim:

1. A method for protecting components of smart cards from fraudulent use, wherein each of said components comprises a read-only memory (ROM) and a programmable memory and is locked as long as a unique unlock order involving a secret key (SK) respectively characteristic of said component has not been applied to said component, comprising the steps of:

writing in each of said components, at the time of its manufacture, a value (V) and a result (R) and relating said result (R) to said value (V) by a given algorithm (A) and said respective characteristic secret key (SK) according to the relationship R=A(V.SK); and unlocking a component only when a unique unlock order including said respective characteristic secret key (SK) of said component and fulfilling said relationship is applied to said component.

2. The method of claim 1, wherein said writing step comprises entering said value (V) in the ROM of the component, and entering said result (R) in the programmable memory of the component.

3. The method of claim 2, further comprising the steps of:

writing a number N in said component during said writing step; and storing the secret key (SK) in another smart card, in a form diversified by said number (N) according to the relationship SK=A(N, SMK), where SMK is a secret master key.

4. The method of claim 1, further comprising the steps of:

writing a number N in said component during said writing step; and storing the secret key (SK) in another smart card, in a form diversified by said number (N) according to the relationship SK=A(N, SMK), where SMK is a secret master key.

5. The method of claim 1, wherein said value (V) is entered in the ROM of the component and said result (R) is entered in the programmable memory of the component, and further comprising the steps of:

writing a number (N) peculiar to said component in said programmable memory;

storing said secret key (SK) in a form related to a secret master key (SMK) and said number (N) by the relationship SK=A(N, SMK); and using said secret key (SK) to produce an unlock order to unlock the component in said smart card having said number (N) in the programmable memory.

6. The method of claim 5, wherein said secret key (SK) is stored in a second smart card.

7. The method of claim 6, wherein a series of said numbers (N) are stored along with said secret master key (SMK) so that a series of secret keys (SK) are stored in said second smart card.

8. The method of claim 1, wherein said result (R) is selected to be different in the components in different smart cards and different secret keys (SK) are stored for the different smart cards.

9. The method of claim 1, wherein said component comprises a silicon chip.

10. A process for producing a smart card comprising the steps of:

manufacturing a locked memory component comprising a read-only memory (ROM) and a programmable memory, said component being unlockable by the application thereto of an unlock order, involving a secret key (SK) having a characteristic value;

masking said ROM and entering a value (V) therein;

writing a number (N) peculiar to said component and a result (R) in said programmable memory, said result (R) being related to said value (V) by means of an algorithm (A) and said secret key (SK) according to the relationship R=A(V.SK);

mounting said component on said smart card;

unlocking said component by applying an unlock order using the characteristic value of said secret key (SK) and fulfilling said relationship; and customizing said programmable memory.

11. The process of claim 10, wherein said unlocking step comprises:

comparing the result (R) written in said programmable memory with a result (R) calculated using said relationship; and producing an unlock order when said results match.

12. The process of claim 10, wherein said unlocking step comprises:

storing said secret key (SK) in a second smart card having a secret master key (SMK), wherein said secret key (SK) is related to said secret master key (SMK) and said number (N) by the relationship SK=A(N, SMK); and using said secret key (SK) in said second smart card to produce an unlock order to unlock the component in said produced smart card having said number (N) in the programmable memory.

13. The process of claim 12, wherein a series of said numbers (N) are stored along with said secret master key (SMK) so that a series of secret keys (SK) are stored in said second smart card.

14. The process of claim 10, wherein said locked memory component comprises a silicon chip.

15. A smart card having a locked memory component being unlockable by the application of an unlock order involving a secret key (SK) having a characteristic value, said component comprising:

a read-only memory (ROM) having a value (V) entered therein; and a programmable memory having a number (N) peculiar to said component and a result (R) written therein, said result (R) being related to said value (V) by means of an algorithm (A) and said secret key (SK) according to the relationship R=A(V.SK), whereby said component is unlockable by applying an unlock order using the characteristic value of said secret key (SK) and fulfilling said relationship.

16. A smart card as in claim 15, wherein said locked memory component comprises means for unlocking in response to an unlock order produced by a secret key (SK) related to said number (N) and a secret master key (SMK) according to the relationship SK=A(N, SMK).

17. A smart card as in claim 15, wherein said locked memory component comprises a silicon chip.

* * * * *